March 31, 1931.  E. F. WESTON  1,798,823
ELECTRIC TACHOMETER
Filed Nov. 11, 1927  4 Sheets-Sheet 1
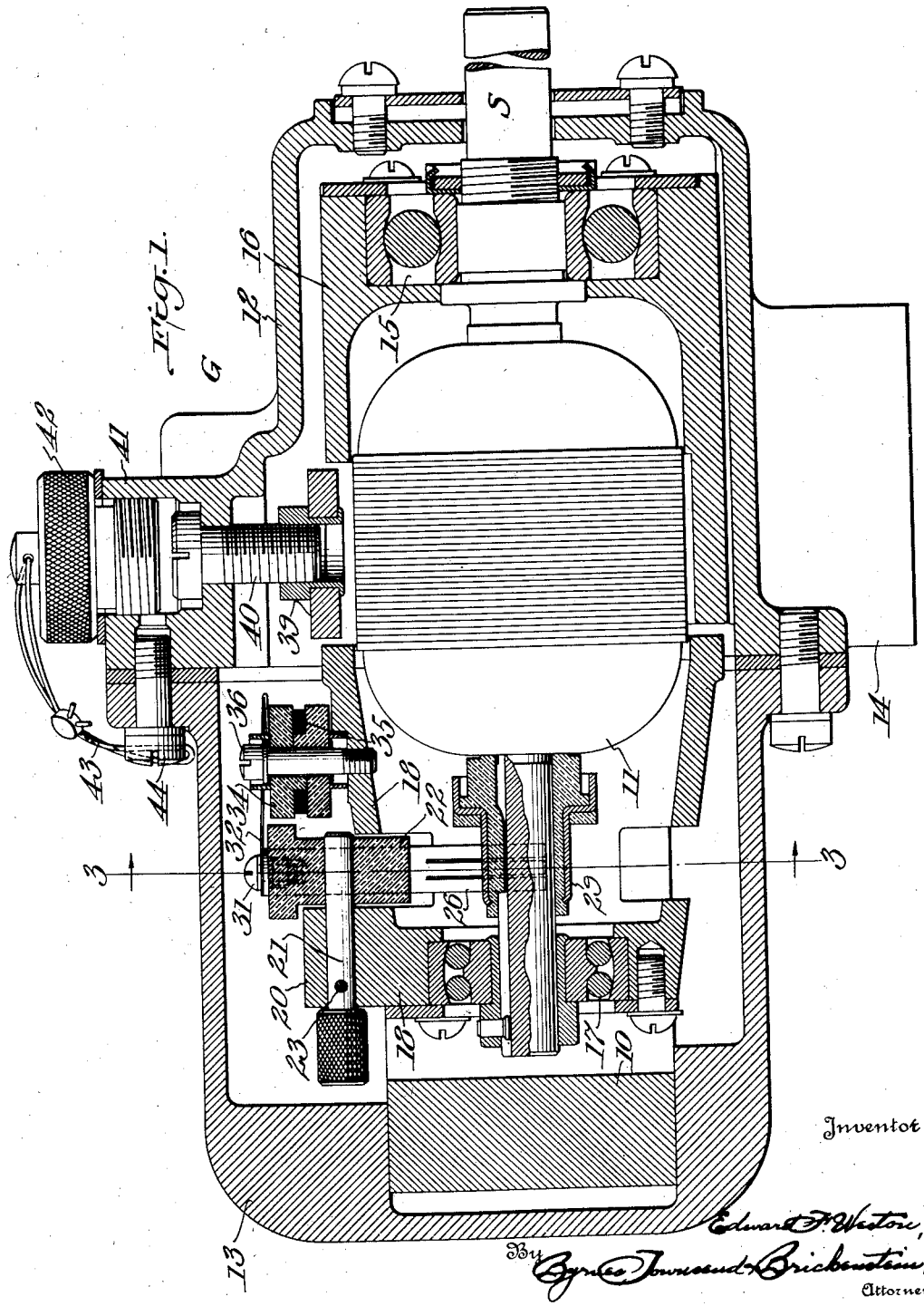

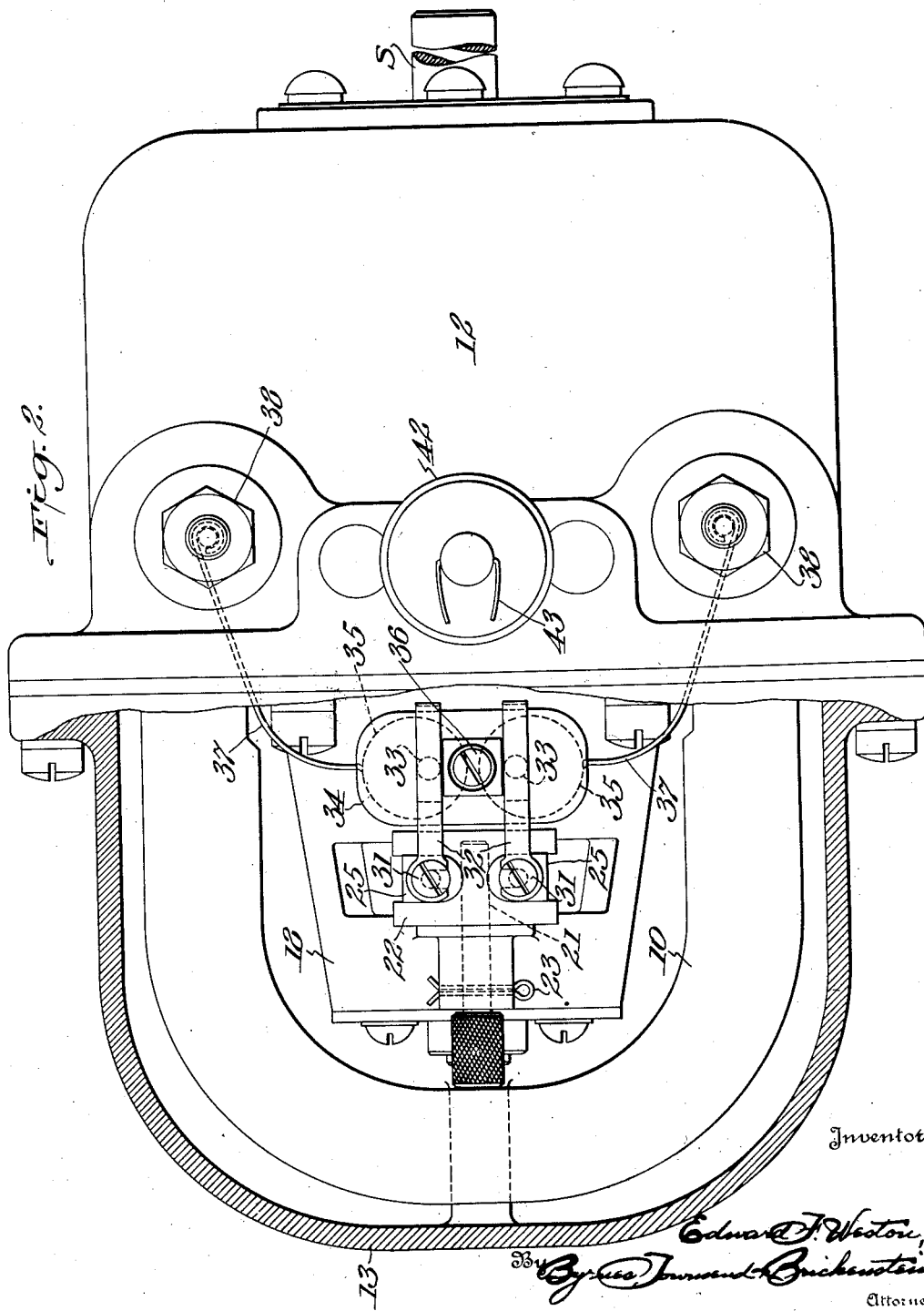

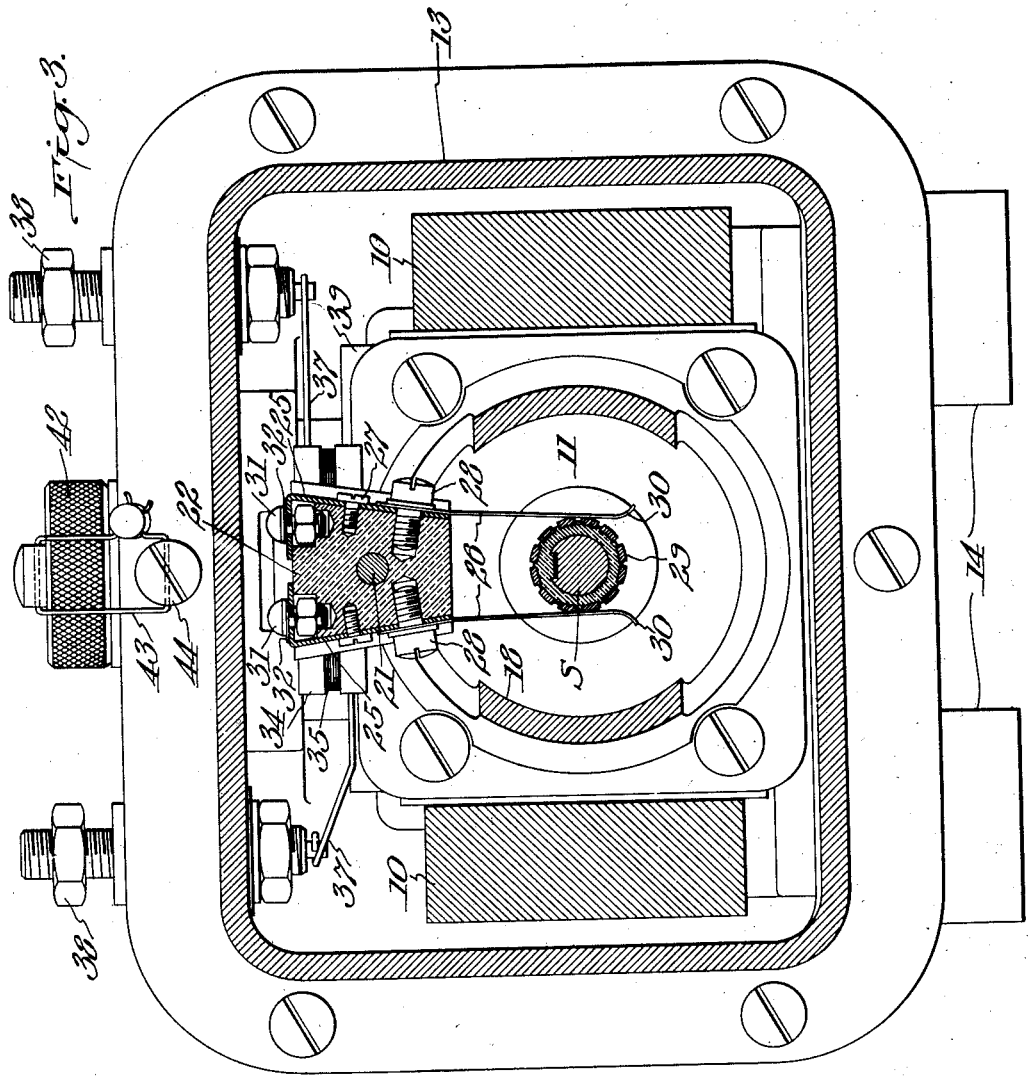

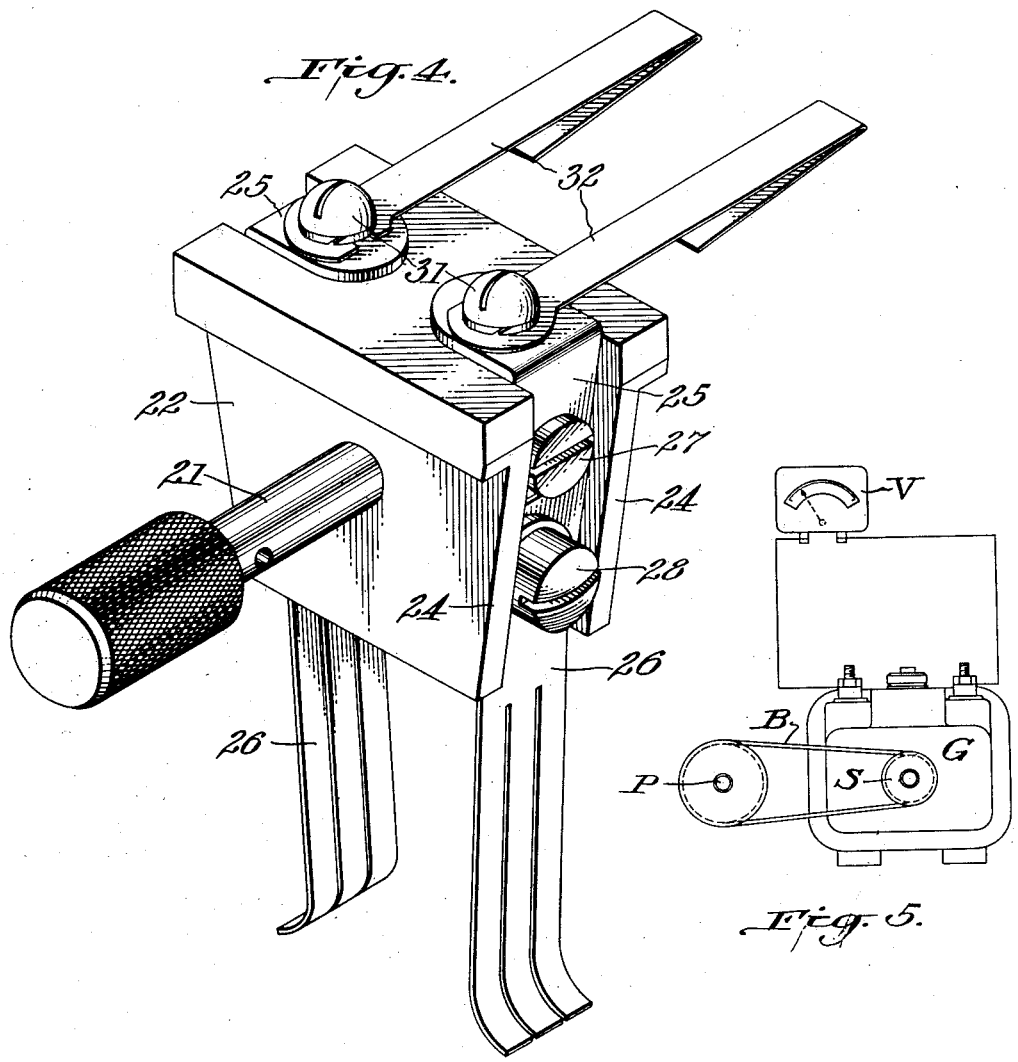

Patented Mar. 31, 1931

1,798,823

UNITED STATES PATENT OFFICE

EDWARD F. WESTON, OF NEWARK, NEW JERSEY, ASSIGNOR TO WESTON ELECTRICAL INSTRUMENT CORPORATION, OF NEWARK, NEW JERSEY, A CORPORATION OF NEW JERSEY

ELECTRIC TACHOMETER

Application filed November 11, 1927. Serial No. 232,660.

This invention relates to improvements in electric tachometers or speed indicating systems of the type in which a generator is operated from the shaft whose speed is to be investigated, and a voltmeter or millivoltmeter is connected across the generator, the voltmeter scale being graduated in revolutions per minute, speed or rate of production per hour, or the like.

Speed indicating or recording systems of this type are based upon the theory that the voltage across the generator terminals is proportional to the speed of rotation of the armature. The voltage established in the armature windings varies with the armature speed but experience has shown that the output voltage was not a progressively varying function of the armature speed. The problem of the commutation of the generated current was not satisfactorily solved in prior tachometers as the rate of voltage increase with increasing speed fell off during certain speed ranges, and in some constructions the output voltage decreased with increasing speed in certain speed ranges.

An object of the present invention is to provide an electric tachometer which will be free from the objections noted above, within the range of speeds ordinarily used. A further object is to provide a tachometer which may be readily adjusted for purposes of calibration. More specifically an object of the invention is to provide a tachometer in which the generator element is provided with brushes and a brush mounting of such construction that the brushes each exert substantially the same pressure upon the commutator.

These and other objects of the invention will be apparent from the following specification, when taken with the accompanying drawings in which Fig. 1 is a longitudinal central section through the generator element of the tachometer, Fig. 2 is a plan view of the generator, a part of the casing being broken away to show the brush holder, Fig. 3 is a section through the generator as taken on line 3—3 of Fig. 1, Fig. 4 is an enlarged perspective view of the brush holder, and Fig. 5 is a schematic diagram of the complete tachometer system.

As shown diagrammatically in Fig. 5, the tachometer system is of a known type, including a generator G having an armature shaft S which is driven, through belt B and pulley P, from the shaft whose speed is to be recorded, the terminals of the generator being connected to the voltmeter or millivoltmeter V.

The present invention resides in the structural details of the generator G which contribute to the uniform and reliable performance of the complete tachometer assembly.

As shown in the detail views, the generator G is a magneto generator, including a permanent magnet 10 and armature 11. The magnet 10 is of U-shape and is supported at its ends in recesses formed in the inner walls of the casing 12 and cover plate 13. The casing 12 is provided with pedestals 14 for mounting the generator upon a suitable support or bracket.

One end of the armature shaft is supported by a ball bearing 15 mounted in a casting 16 which is fixed to the casing 12, and the opposite end of the armature shaft is carried by a ball bearing 17 in a casting 18. The casting 18 is provided with a boss 20 in which the bearing rod 21 for the brush holder 22 is fixed by means of a cotter pin 23.

As best shown in Figs. 3 and 4, the brush holder 22 is of wedge shape, the side edges having flanges 24 defining a recess for receiving the contact strips 25 and the spring metal brushes 26. Contact strips 25 are secured to the brush holder 22 by screw 27, and the brushes are clamped against the contact strips by screws 28. As shown in Fig. 3, the taper of the sides of the brush holder is such that when flat metal brushes 26 are employed, the brushes are somewhat flexed by the commutator 29. For convenience in assembling the brush holder on the generator, the lower ends 30 of the brushes 26 are bent outwardly, but the main portions of the brushes may be substantially flat.

The upper ends of contact strips 25 are bent over the top of the brush holder and are threaded to receive the screws 31 which clamp the notched ends of flexible connectors 32 to the contact strips. The connectors 32 are preferably formed of thin sheet metal straps which are secured at their opposite ends to contacts 33 on the resistance element 34, Fig. 2. The resistance element comprises a pair of resistance coils 35 held between spaced insulating plates, the assembled unit being fixed to the casting 18 by a bolt 36. Each resistance coil 35 has one end connected to a contact 33 and its opposite end connected through leads 37 to the generator terminals 38.

The magnetic shunt 39 which is adjustably mounted on casting 12 by the screw 40 provides a convenient means for effecting the initial adjustment of the generator, and for correcting for variations in the sizes of the pulleys or other motion transmitting mechanism which is employed between the machine shaft and the generator. The outer end of adjusting screw 40 is seated in a socket 41, the socket being closed by a threaded cap 42 which is apertured to receive a sealing wire 43. The sealing wire passes through a bolt 44 which extends through the cover 13 and into the casing 12. Any attempt to vary the adjustment of the generator or to have access to the interior of the casting will require a breaking of the seal.

The general operation of the tachometer will be apparent to those familiar with devices of this type. The voltage generated in the armature windings is proportional to the angular speed of the shaft by which the generator is driven. Due to the novel brush and brush holder construction, the voltage across the generator terminals is also proportional to the speed of the shaft, and affords, when impressed upon voltmeter V, readings which are direct indications of the speed of the machine shaft. The voltmeter scale may be graduated in revolutions per minute, speed of travel per hour, rate of production, or in units of any other quantity which is a function of the machine speed.

Upon disconnecting the flexible connectors 32 from the brush holder and withdrawing the bearing rod 21, the brush holder may be removed from the generator. This brush and holder construction avoids the difficulties which have been experienced in securing proper contact pressure when worn or broken brushes were replaced by new brushes. The proper pressure will always be secured when the brushes are mounted on the holder, and the holder is assembled on its bearing rod 21. The contact pressure is determined by the size and relative location of the generator parts as furnished by the manufacturer, and not by the adjustment of the position of the brush holder or of springs carried by the brush holder.

Due to the pivotal mounting of the brush holder, the two brushes exert equal pressure upon the commutator. This provision for constant and equal pressures between the brushes and the commutator is a distinguishing feature of the present invention.

The resistance of the coils 35 is so chosen, for any given tachometer, that approximately full scale readings of the voltmeter V are obtained at the maximum speed of the machine shaft with which the generator is associated. A rough calibration of the generator and voltmeter may be obtained by varying the resistance of the coils 35, but the final adjustment is best obtained by means of the magnetic shunt 39.

It will be understood that the tachometers giving readings which are proportional to the armature speed may be constructed without employing the exact structural details which are described in this specification. In accordance with this invention the generator is so constructed that the terminal voltage is a substantially linear function of the armature speed and this result is obtained by employing brushes and brush holders of such design that the contact pressure at all brushes is equal and is independent of the armature speed. Subject to this limitation, the design of the several elements of the tachometer may be varied within wide limits and various changes may be made in their relative shape, size and location without departing from the spirit of my invention as set fourth in the following claims.

I claim:

1. In an electric tachometer, a generator having an armature, commutator, a bearing rod providing a pivotal support for a brush holder, and a brush holder, said brush holder comprising a body of insulating material of wedge shape, a pair of flanges extending along each side of said brush holder, contact strips at each side of said brush holder and positioned between the respective pairs of flanges, said contact strips being bent to overlie the top of the brush holder, and a flat metal brush at each side of said brush holder and fixed thereto in engagement with the respective contact strips.

2. A generator comprising a permanent magnet, an armature shaft and means supporting the same, an armature and commutator on said shaft, a pair of flat spring metal brushes engaging said commutator at opposite sides thereof, a brush holder, means securing said pair of brushes to opposite sides of said brush holder, the opposite sides of said brush holder being so shaped and arranged with respect to said commutator that said brushes are flexed when secured to said brush holder, and a bearing rod removably carried by the said means which supports said armature shaft, said bearing rod being parallel to said shaft and providing a pivotal support for said brush holder to permit equalization of the contact pressure between said flexed brushes and said armature.

3. In a generator, the combination with an armature and armature shaft, a commutator on said shaft, and a frame supporting said shaft, said frame being provided with a passageway therethrough in transverse alinement with said commutator, of a bearing rod extending into said passageway and parallel to said shaft, a brush holder in said passageway and pivotally mounted on said bearing rod, and spring metal brushes secured to said brush holder and bearing upon said commutator.

4. The invention as set forth in claim 3 wherein said brush holder comprises a body of insulating material of wedge shape, and is provided with a pair of flanges extending along each side thereof, said flanges defining recesses for receiving the ends of said brushes.

In testimony whereof, I affix my signature.

EDWARD F. WESTON.